Aug. 9, 1949.    S. E. BARTELSON    2,478,679
PROJECTOR DRIVE MECHANISM
Filed Oct. 23, 1945
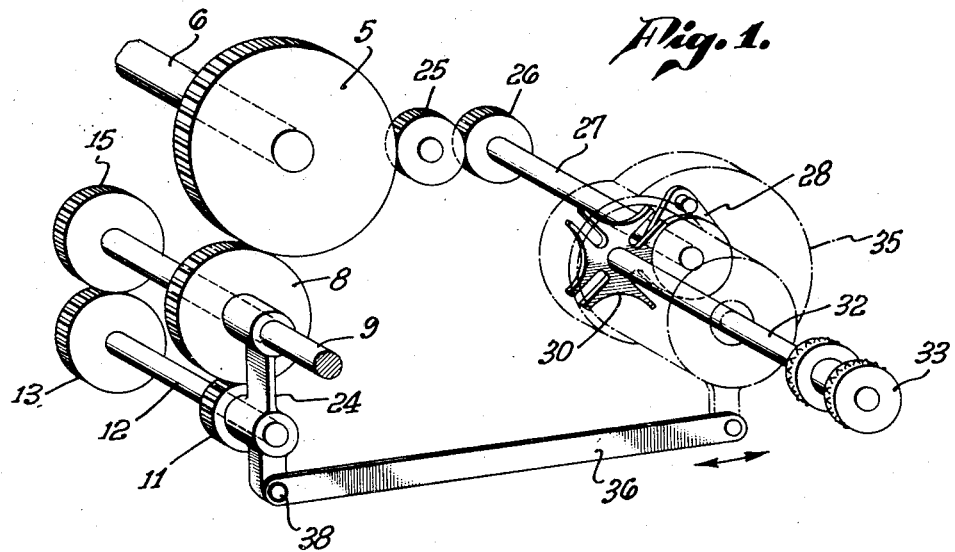
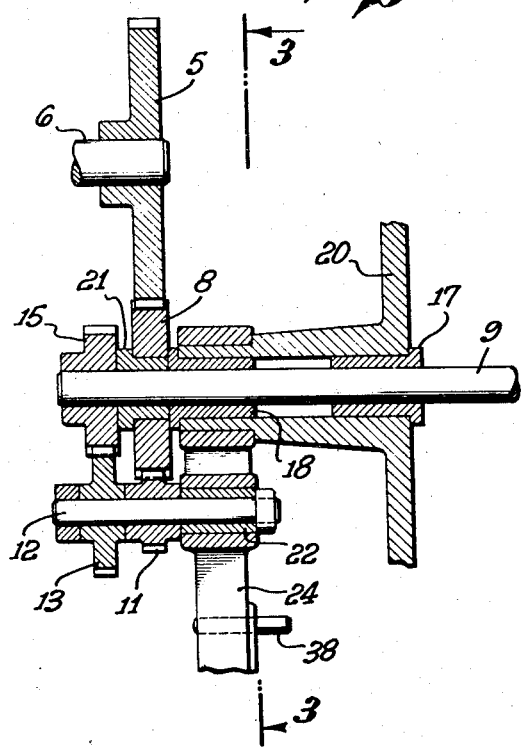
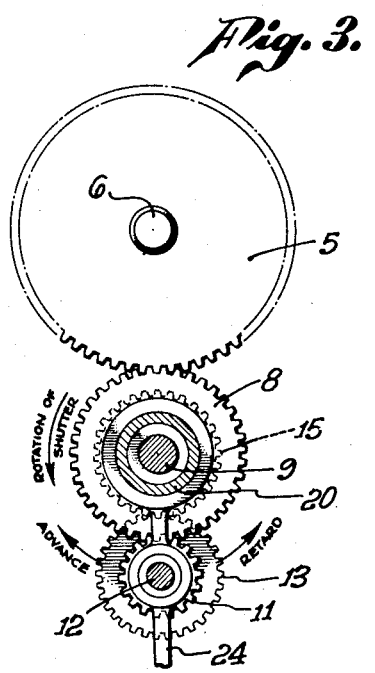
INVENTOR
STEN E. BARTELSON,
BY
ATTORNEY Patented Aug. 9, 1949

2,478,679

UNITED STATES PATENT OFFICE 2,478,679

PROJECTOR DRIVE MECHANISM

Sten E. Bartelson, Indianapolis, Ind., assignor to Radio Corporation of America, a corporation of Delaware Application October 23, 1945, Serial No. 623,993

4 Claims. (Cl. 88—18)

This invention relates to motion picture apparatus, and particularly to an improved framing mechanism for a projector of motion picture film.

In the projection of motion pictures, it is necessary, from time to time, to advance or retard the film with respect to the projection aperture, so that the border of each particular picture corresponds or aligns with the upper and lower edges of the projection aperture. When an advance or retardation is made, it is also necessary to vary the angular placement of the light interrupting shutter, so as to intercept the light beam during the pull-down period of the film. That is, there should be no light projected to the screen during any portion of the pull-down cycle.

There have been suggested and used different methods and means for keeping the intermittent film sprocket synchronized with the shutter when framing a picture in the aperture. Some of these include worms which shift with respect to the intermittent sprocket, the bodily rotation of the intermittent sprocket, and the transposing of the intermittent sprocket. These prior arrangements are quite complicated and expensive, and when the intermittent sprocket is transposed, the sprocket moves away from the film gate, and, in many instances, produces a film stop or damage to the film. The present invention accomplishes the synchronizing of the pull-down or intermittent sprocket and the shutters by arranging a set of intermediate gears on a countershaft which is rotated about the shutter shaft, and interlinking this set of gears with the star wheel housing of the intermittent mechanism, which is rotated about the axis of the fixed pull-down sprocket.

The principal object of the invention, therefore, is to facilitate the synchronizing of an intermittent film sprocket turn-over with the rotation of a light interrupting shutter of a motion picture projector.

Another object of the invention is to provide an improved drive mechanism for the shutter of a motion picture projector in combination with its pull-down mechanism.

A further object of the invention is to provide an improved synchronizing mechanism between the film pull-down sprocket and the shutter of a motion picture projector.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a diagrammatic, perspective view of the main driving elements embodying the invention.

Fig. 2 is a cross sectional view of the interconnected gears for driving the shutter, and Fig. 3 is an elevational view taken along the line 3—3 of Fig. 2.

Referring now to the drawings, in which the same numerals identify like elements, a main drive gear 5 rotated by a shaft 6 is geared with an idler 8 rotatable on the shutter shaft 9, the shutter not being shown. The gear 8 is meshed with a gear 11 locked with a gear 13, both of which are mounted on a shaft 12. Gear 13 meshes with and drives gear 15 on the shutter shaft 9. As shown in Figs. 2 and 3, the shutter shaft 9 rotates in bearings 17 and 18 mounted in the frame 20. The idler gear 8 rotates on a sleeve 21, and the shaft 12 on a sleeve 22.

Mounted for rotation on the frame 20 is an arm 24 which carries the countershaft 12 and the gears 11 and 13. Since the axis of gears 11 and 13 remains the same distance from the axis of the shutter shaft 9 during rotation of the arm 24, there will be an angular displacement between the drive shaft 6 and the shutter shaft 9 as the arm is rotated in either direction. That is, one direction of rotation of arm 24 will advance the leading edge of the shutter with respect to the drive shaft 6, and the reverse direction of rotation of arm 24 will retard the shutter with respect to drive shaft 6, as illustrated in Fig. 3.

Referring now to the remaining portion of Fig. 1, the drive gear 5 is meshed with an idler gear 25 which drives a gear 26 on a shaft 27 which carries a pin wheel 28. As is well-known, the pin wheel 28 intermittently rotates a star wheel 30 on a shaft 32 on which an intermittent sprocket 33 is mounted. The pin wheel is housed in a casing 35 to which one end of a link member 36 is connected, the other end of the link 36 being connected to a pin 38 on the end of arm 24.

The arrangement of the elements 25 to 35 is such that the axis of the shaft 32 is coincident with the axis of gear 25, and the gear 26, shaft 27, and wheel 28 are rotatable about the axis of shaft 32 by movement of link 36. Thus, the phase or angular position of the shaft 32 may be shifted with respect to the drive shaft 6 which either advances or retards the film, depending upon the direction of rotation of the housing 35. However, since any movement of the housing 35, which is made to frame the film in the projection aperture, is accompanied by a movement of the arm 24 through link 36, the shutter will be correspondingly advanced or retarded to maintain synchronism between the sprocket 33 and the shutter. Although a Geneva or Maltese cross type of intermittent sprocket drive has been illustrated, it is to be understood that other forms of intermittent drives may be employed.

I claim:

1. A drive mechanism comprising a main drive gear adapted to be rotated at a substantially constant speed, a shutter shaft, an idler gear in mesh with said drive gear and rotatable on said shutter shaft, a countershaft having a pair of locked gears thereon, a drive gear on said shutter shaft, one of said pair of locked gears being in mesh with said idler gear, and the other of said locked gears being in mesh with said shutter drive gear, means for rotating said countershaft about said shutter shaft, an intermittent sprocket, a shaft for said sprocket, a gear in mesh with said drive gear and having its axis in alignment with said sprocket shaft, means for driving said sprocket intermittently, said means including a shaft parallel with said sprocket shaft, said parallel shaft having a gear and a pin wheel thereon, and means interconnecting said last mentioned shaft and said counter shaft rotation means for synchronizing the turnover of said intermittent sprocket with the rotation of said shutter shaft.

2. A drive mechanism comprising a main drive gear, a shutter shaft, a gear in mesh with said main drive gear and rotatable on said shutter shaft, a drive gear on said shutter shaft for driving said shutter shaft, an arm pivoted about the axis of said shutter shaft, a shaft on said arm having its axis parallel with the axis of said shutter shaft, a pair of interlocked gears on said shaft, one of said gears being meshed with said idler gear, and the other of said interlocked gears being meshed with said shutter shaft drive gear, means for moving said pivoted arm to vary the angular displacement between the shutter shaft and the shaft of said main drive gear, an intermittent film sprocket driven from said main drive gear, the driving mechanism between said intermittent sprocket and main drive gear including a shaft for said intermittent sprocket, an idler gear in mesh with said main drive gear and having its axis coincident with the axis of said intermittent sprocket shaft, a second shaft having its axis parallel with the axis of said intermittent sprocket shaft, said second shaft having a gear thereon in mesh with said idler gear and a pin wheel thereon for intermittently rotating said sprocket, and means for rotating said second shaft about said intermittent sprocket shaft to vary the turnover of said sprocket with respect to the rotation of said main drive gear.

3. A drive mechanism comprising a main drive gear, a shutter shaft, a plurality of gears interposed between said drive gear and said shutter shaft for driving said shutter shaft, a sprocket, a shaft for said sprocket, a plurality of gears interposed between said sprocket shaft and said main drive gear for rotating said sprocket, an intermittent drive mechanism between said plurality of gears and said sprocket shaft for imparting intermittent motion to said sprocket, said first mentioned plurality of gears including an idler gear mounted on said shutter shaft, a drive gear for said shutter shaft and mounted thereon, an arm pivoted on said shutter shaft, a pair of gears mounted on said arm, one gear of said pair being in mesh with said idler gear, and the other gear of said pair being in mesh with said shutter shaft drive gear, and means interconnecting said intermittent drive mechanism and said pivoted arm for synchronizing the turnover of said sprocket with the rotation of said shutter shaft.

4. A drive mechanism comprising a main drive gear, a shutter shaft, a plurality of gears interposed between said drive gear and said shutter shaft for driving said shutter shaft, one of said gears being rotatable on said shutter shaft, one of said gears being fixed to said shutter shaft, and two other of said gears being in mesh with said first two gears and fixed on a stub shaft rotatable about said shutter shaft, a sprocket, a shaft for said sprocket, a plurality of gears interposed between said sprocket shaft and said main drive gear for rotating said sprocket, an intermittent drive mechanism between said plurality of gears and said sprocket shaft for imparting intermittent motion to said sprocket, said last mentioned plurality of gears including an idler gear having an axis coincident with the axis of the intermittent sprocket shaft, a pin wheel, a second shaft on which a second gear is mounted in mesh with said idler gear and on which said pin wheel is mounted, means for rotating said second shaft about the axis of said intermittent sprocket shaft, and means for interlinking said last mentioned means with said stub shaft for simultaneously varying the angular relationship of said intermittent sprocket in correspondence with the angular relationship of said shutter shaft.

STEN E. BARTELSON.

REFERENCES CITED

The following references are of record in the file of this patent:

UNITED STATES PATENTS

| Number | Name | Date |
|---|---|---|
| 325,220 | Worth | Aug. 25, 1885 |
| 1,389,824 | Gauriat | Sept. 6, 1921 |
| 1,521,785 | Morton | Jan. 6, 1925 |
| 1,531,085 | Ellwood | Mar. 24, 1925 |
| 1,746,385 | Dina | Feb. 11, 1930 |

FOREIGN PATENTS

| Number | Country | Date |
|---|---|---|
| 377,827 | France | July 22, 1907 |
| 428,849 | France | July 1, 1911 |
| 846,703 | France | Sept. 25, 1939 |